United States Patent Office 3,657,397
Patented Apr. 18, 1972

3,657,397
TRIALKYL PHOSPHITE-LONG CHAIN ALKENYL HYDROCARBON-SUBSTITUTED SUCCINIC ANHYDRIDE REACTION PRODUCTS
William T. Brannen, West Lake, Ohio, assignor to Standard Oil Company, Chicago, Ill.
No Drawing. Filed May 8, 1969, Ser. No. 823,176
Int. Cl. C07f 9/02; C10l 1/26; C10m 1/46
U.S. Cl. 260—921                                    7 Claims

ABSTRACT OF THE DISCLOSURE

Trialkyl phosphites, e.g. tributyl phosphite, are reacted with alkenyl hydrocarbon-substituted succinic anhydrides, in which the alkenyl hydrocarbon contains at least 30 carbon atoms, to obtain reaction products which are useful as additives in hydrocarbon fuels and in lubricating oils.

BACKGROUND OF THE INVENTION

The reaction between trialkyl phosphites and simple anhydrides in the presence of an acid catalyst, e.g. acetic acid, has been reported by G. Kamai and V. A. Kukhtin in Doklady Akad. Navk. SSSR 102, 283 (1955). Literature reports indicate that such reactions yield essentially α-ketophosphonates which are hydrolytically unstable. Such products are therefore unsuitable as addition agents for hydrocarbon fuels and/or lubricants. It is therefore an object of the present invention to obtain hydrolytically stable reaction products of trialkyl phosphites and anhydrides which are suitable for use as additives for fuels and lubricants.

SUMMARY OF THE INVENTION

The new compositions of the present invention are prepared by reacting in the absence of an acid catalyst, e.g. acetic acid, at reflux temperatures, for a period of from about 0.5 to about 10 hours preferably about 6 hours, an alkyl phosphite, having from 1 to about 16 carbon atoms in each alkyl group and an alkenyl hydrocarbon substituted succinic anhydride in which the alkenyl substituent contains at least 30 carbon atoms, in mole ratios of from about 1:2 to 2:1; removing unreacted alkyl phosphite from the reaction mass by suitable means, e.g. vacuum stripping, and filtering to recover the desired reaction product.

The alkenyl hydrocarbon-substituted succinic anhydride reactant is readily obtained by reacting maleic anhydride with a polymer of mono-olefins or iso mono-olefins, or mixtures thereof, having from 2 to about 12 carbon atoms, preferably from 2 to about 5 carbon atoms, such polymers having at least 30 carbon atoms, and molecular weights in the range of from about 400 to about 100,000. The polymers may be homopolymers or interpolymers of such mono-olefins. Chlorinated derivatives of such polymers may also be reacted with maleic anhydride. Other high molecular weight aliphatic, or, substantially aliphatic hydrocarbons, both naturally occurring or synthesized can also be reacted with the maleic anhydride. Methods of preparing the polymers are well known to the art. A suitable polymer can be obtained by polymerizing in the liquid phase a hydrocarbon mixture containing butenes and isobutene together with butanes and some $C_3$ and $C_5$ hydrocarbons at temperatures between about 0° F. and 30° F. in the presenece of a Friedel-Crafts catalyst, e.g. $AlCl_3$.

The alkyl phosphite reactant has the general formula $P(OR)_3$ in which the R is an alkyl group containing from 1 to about 16 carbon atoms. The alkyl groups may be the same or different alkyl radicals. Examples of such alkyl phosphites are: tributyl phosphite; triethyl phosphite; triamyl phosphite; trinonyl phosphite; tridodecyl phosphite; tricetyl phosphite; ethyl dibutyl phosphite, dipropyl butyl phosphite; diethyl amyl phosphite; dibutyl hexyl phosphite; diamyl dodecyl phosphite; etc.

The reaction products of the present invention differ from the reaction products obtained by the similar reaction of trialkyl phosphites and simple anhydrides as reported by G. Kamai and V. A. Kukhtin, supra. The literature reports indicate that the reaction of the trialkyl and simple anhydrides yield α-ketophosphonates. However, the reaction of trialkyl phosphites and the polymeric succinic anhydride of the present invention yields primarily pseudo ester phosphonates which differ greatly from the known α-ketophosphonates; as indicated by the following major differences between the two:

| Pseudo-ester phosphonates | α-ketophosphonates |
|---|---|
| 1. Stable in cold caustic, retaining phosphorus content. | 1. Unstable in cold caustic, losing all phosphorus from the organic portion. |
| 2. One major carbonyl band in infrared at 5.76. | 2. Two major carbonyl bands in infrared at 5.76 and 5.86. |

The hydrolytic stability of the pseudo- ester phosphonate is adavntageous for the use of such products as additives in hydrocarbon fuels and lubricating oil compositions as anti-wear agents and as EP agents. Such reaction products are useful as anti-wear and EP agents in amounts of from about 0.01% to about 20% in hydrocarbon fuels, e.g. gasoline, and in lubricant compositions including lubricating oils and lubricant greases. The lubricating oil can be any normally liquid lubricant such as, for example, mineral oils, synthetic hydrocarbon lubricating oils, high molecular weight esters of carboxylic acids, silicone oils within the lubricating oil range, etc. Lubricating oils are usually within the viscosity range of from about 80 SSU at 100° F. to about 300 SSU at 210° F. Fuel and lubricant compositions containing the reaction products of this invention may also contain other well known additives, such as corrosion inhibitors, detergents, sludge inhibitors, anti-knock agents, V.I. improvers etc.

PREFERRED EMBODIMENTS

The following examples illustrate the preferred embodiments of this invention:

EXAMPLE I 250 grams of a polybutenyl succinic anhydride (prepared by reacting maleic anhydride with a polybutene having a molecular weight of 450) and 250 grams of tributyl phosphite were refluxed for 6 hours. The unreacted tributyl phosphite was removed by vacuum stripping, and the product then filtered. The recovered filtrate had a phosphorus content of 7.24%.

EXAMPLE II 250 grams of a polybutenyl succinic anhydride (prepared by reacting maleic anhydride with a polybutene having a molecular weight of 800) and 62.5 grams of tributyl phosphite were refluxed for 6 hours. The unreacted tributyl phosphite was removed by vacuum stripping, and the product filtered. The recovered filtrate had a phosphorus content of 2.43%.

Samples of a lubricating oil containing the products of Examples I and II, and the polybutenyl succinic anhydride use in Example II were subjected to the Falex Test. The following results were obtained:

| Additive | Falex test jaw load failure |
|---|---|
| Sample No: | |
| A ........ 1% Example I | 4,000 lbs. |
| B ........ 5% Example I | 4,500 lbs. (no failure). |
| C ........ 5% Example II | 4,000 lbs. |
| D ........ 5% polybutenyl succinic anhydride of Example II. | 1,500 lbs. |

The above data demonstrate that the polymeric succinic anhydrides do not exhibit any anti-wear or EP properties by themselves.

Percentages given herein and in the appended claims are weight percentages unless otherwise stated.

While particular preferred embodiments of the invention have been described, it is to be understood that the invention is not limited thereto, but includes within its scope such modifications and variations as come within the spirit and scope of the appended claims.

I claim:
1. A new composition of matter obtained by reacting in the absence of an acid catalyst at reflux temperature a trialkyl phosphite having from 1 to about 16 carbon atoms in each alkyl group, and an alkenyl hydrocarbon-substituted succinic anhydride in which the alkenyl substituent has a molecular weight in the range of 400–100,000 in the respective reactant mole ratios of from about 1:2 to about 2:1.

2. A new composition of matter as described in claim 1, in which the trialkyl phosphite is tributyl phosphite.

3. A new composition of matter as described in claim 1, in which the trialkyl phosphite is triethyl phosphite.

4. A new composition of matter as described in claim 1, in which the alkenyl hydrocarbon-substituted succinic anhydride is a polybutenyl substituted succinic anhydride wherein the polybutenyl substituent has a molecular weight in the range of 400–100,000.

5. A new composition of matter as described in claim 4, in which the polybutenyl substituent has a molecular weight of about 450.

6. A new composition of matter as described in claim 4, in which the polybutenyl substituent has a molecular weight of about 800.

7. A new composition of matter as described in claim 1, in which the trialkyl phosphite is tributyl phosphite and the alkenyl hydrocarbon-substituted succinic anhydride is a polybutenyl substituted succinic anhydride wherein the polybutenyl substituent has a molecular weight of from about 450 to about 800.

No references cited.

JOSEPH REBOLD, Primary Examiner

A. H. SUTTO, Assistant Examiner

U.S. Cl. X.R.

44—70, 76, DIG 4; 252—49.8; 260—942